Figure 1:
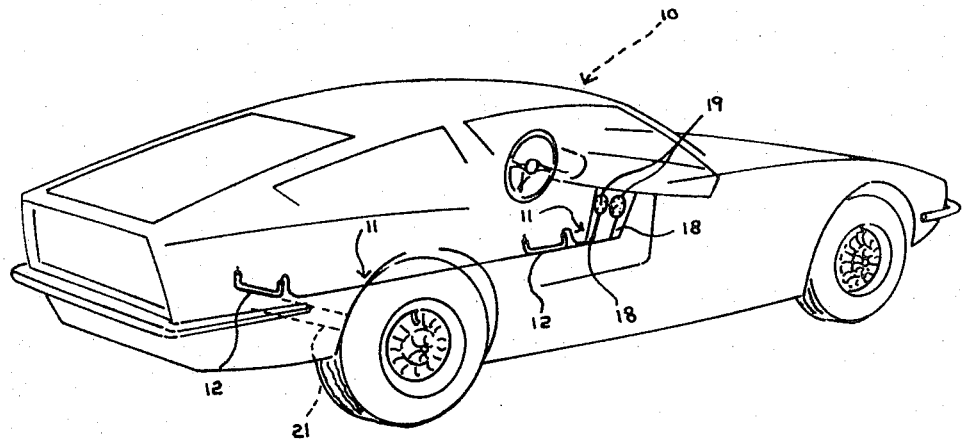

United States Patent [19]

Brandt, Jr.

[11] 3,757,589
[45] Sept. 11, 1973

[54] FORCE INDICATOR
[76] Inventor: Robert O. Brandt, Jr., 5027-C, Ft. Sumter Rd., Raleigh, N.C.
[22] Filed: May 20, 1971
[21] Appl. No.: 145,296

[52] U.S. Cl. .................................... 73/502, 73/515
[51] Int. Cl. ........................................... G01p 15/02
[58] Field of Search ..................... 73/502, 514, 515, 73/516 LM, 497, 393, 509, 510

[56] References Cited
UNITED STATES PATENTS
2,386,777  10/1945  Bentley, Jr. ....................... 73/514 X
404,947    6/1889   Arnold .............................. 73/515 X
1,309,574  7/1919   Klein ................................ 73/515 X
213,467    3/1879   Storer .................................. 73/502

FOREIGN PATENTS OR APPLICATIONS
401,553  11/1933  Great Britain ...................... 73/515

Primary Examiner—James J. Gill
Attorney—John G. Mills, III

[57] ABSTRACT

In abstract, a preferred embodiment of this invention is a remote reading force measuring and indicating device utilizing a generally horizontally disposed, U-shaped liquid containing tube connected to a dial type pneumatic instrument.

6 Claims, 2 Drawing Figures

Patented Sept. 11, 1973 3,757,589

ROBERT O. BRANDT JR.
INVENTOR
BY *John G. Mills*
ATTORNEY

FORCE INDICATOR

This invention relates to measuring devices and more particularly to devices for indicating changes in velocity and centrifugal forces.

In the past, various types of force measuring devices have been used. These have included mercury filled tubes that mechanically activated change in force read out means; direct reading curved tubes for forced indications such as accelerometers and clinometers; weighted masses for operating force indicating mechanisms; and the like. All of these prior known force measuring or indicating devices have either been too complex for practical installation in automobile and motorcycle type motor vehicles or they have been too bulky for such use.

After much research and study into the above mentioned problems, the present invention has been developed to provide an extremely sensitive, low force measuring means which is inexpensive to produce and install, is remote indicating as to read-out and is of low mass so as to be readily installable on the smallest land, water or air vehicle or craft.

To accomplish the desired end results, a remote indicating force measuring instrument has been developed utilizing a generally horizontally disposed liquid filled tube with up-turned ends operatively connected to a pneumatically activated, dial type indicator. This instrument can be used, depending on manner of installation, as an accelerometer to measure increase and decrease in speed, or as a centrifugal force measuring means to indicate heel and side slip conditions.

It is an object, therefore, of the present invention to provide a remote indicating force rate of change measuring device.

Another object of the present invention is to provide a device adapted for use in connection with vehicles for measuring either acceleration-deceleration forces or centrifugal forces.

Another object of the present invention is to provide a liquid activated, pneumatically operated force indicator.

A further object of the present invention is to provide a rate of force change measuring means including a liquid filled, generally horizontally disposed tube means with upwardly turned ends operatively connected through tubular line means to a pneumatically operated visual indicator.

An additional object of the present invention is to provide, in a forced measuring device, a self-zeroing indicator means.

Another object of the present invention is to provide an inexpensive, compact, remote indicating force measuring device.

Another object of the present invention is to provide a force measuring means for measuring both acceleration and/or slip in a moving vehicle.

Other objects and advantages of the present invention will become apparent and obvious from a study of the following description and the accompanying drawings which are merely illustrative of such invention.

Figure 2:
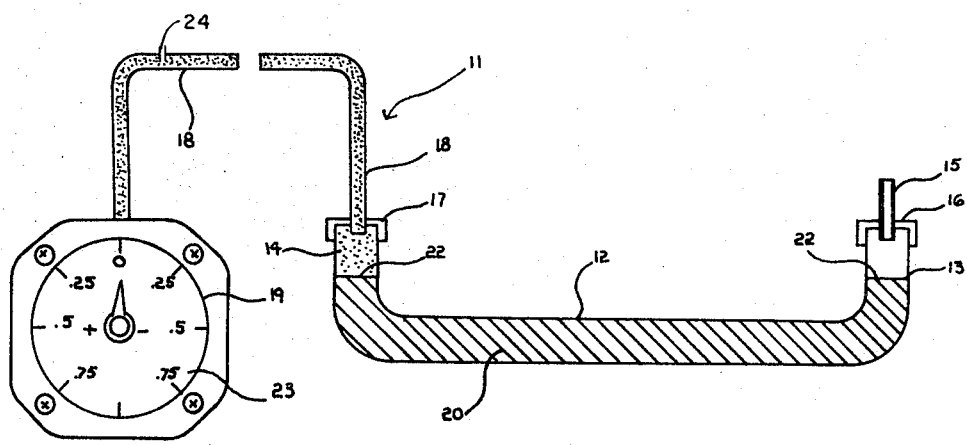

In the drawings:

FIG. 1 is a cutaway perspective view of a typical land type vehicle having the force measuring means of the present invention installed therein; and FIG. 2 is a schematic view of the various operational portions of such indicator.

With further reference to the drawings, a vehicle indicated generally at 10 is shown in outline form with force measuring means of the present invention indicated generally at 11 installed therein. One of these measuring devices has its sensing tube disposed parallel to the longitudinal axis of the vehicle and in a generally horizontal position. A convenient location for this tube has been found in or juxtaposed to the between-seat console or sports cars. In other types of vehicles, the tube could be located at any convenient point.

When the sensing tube is disposed parallel to the longitudinal axis of the vehicle, it will act as an accelerometer and clinometer in that it will measure acceleration and deceleration forces and at a constant speed will indicate the inclination of the surface being traversed as will hereinafter be described in more detail.

If the sensing tube is located either above or below, but in the vertical plane cutting, the axis of the drive axle of the vehicle 10, the force indicator of the present invention will read as a slip meter indicating the centrifugal forces reacting against the direction of travel of the vehicle. This is a valuable asset to a driver, particularly a race driver, in that he can anticipate accurately when his vehicle is approaching the slip or spin-out point in curves and turns. Although shown as disposed in conjunction with the rear wheels of the vehicle 10 of FIG. 1, if the front axle were the drive axle, the sensing tube would be mounted adjacent thereto rather than the rear axle.

As to the details of the force indicating means of the present invention, the sensing tube 12 is preferably straight in configuration with up-turned end portions 13 and 14.

The length of the straight or elongated portion of the sensing tube 12 should be calculated and matched to the specific gravity of the liquid 20 used as the sensing median. A more detail discussion of the output pressure of the sensing tube and the specific gravity of the sensing media will be hereinafter discussed in more detail.

One of the up-turned end portions of the sensing tube 12 is considered the vent end. It is enclosed to prevent dirt and other foreign matter from entering into the tube. A vent line such as that shown at 15, however, is included in the closure 16 so that the tube 12 is open to the atmosphere.

The opposite up-turned end portion 14 from vent end 13 of sensing tube 12 has a closure means 17 therein with one end of a pressure transmitting line 18 communitively passing therethrough.

The end of transmitting line 18 opposite the connection with closure 17 is operatively connected to a pneumatic pressure gauge 19. This gauge can be any one of many well known types of pneumatic pressure indicators. One general type that has been found particularly well adapted for use in the system of the present invention are aircraft type pneumatic indicators such as altimeters, vertical speed indicators, and air speed indicators. Since all three of these instruments are extremely sensitive to small changes in pressure and are readily available on the commercial and used equipment market, they are well suited for the present purpose.

The dial 23 of the read-out indicator 19 is preferably calibrated positively and negatively from a zero point. Although any suitable scale could be used, it has been found convenient to base the calibrations on gravitational forces or what is commonly called G-forces. Thus if the equivalent of one gravity were used as 1.0, the the scale could be calibrated in tenths such as 0.1, 0.2, etc., to 1 gravitational force and thereafter 1.1, 1.2, etc., as high as it is desired to calibrate. Thus the indicator would give readings in plus or minus G-forces which are readily related by the average individual to measurements they are familiar with.

If G-forces are used in the calibration of the indicator 19, then these calibrations would have to be correlated with the length of the sensing tube 12 and the specific gravity of the liquid 20 contained therein since the output pressure, either positive or negative, builds up in the sealed end 14 of tube 12 by forces exerted on said liquid as the prime mover of indicator 19 by way of pressure transmitting line 18.

The formula for determining operating pressure for the indicator 19 would be $Po \pm (G \times S.G) \times L$ where $Po$ is the operating pressure, $G$ is acceleration compared to the earth's gravitational force, $S.G$ is the specific gravity of the liquid contained in the sensing tube and $L$ is the length of the sensing tube. Thus if the sensing tube is 7 inches in length and the liquid contained therein is "red oil" with a specific gravity of 0.827 and one gravity is used for full deflection of the indicator 19, then the operating pressure of the device would be $Po = \pm (1 \times 0.827) \times 7$ or 5.8 inches of $H_2O$. Since operating pressure $Po$ is so small as compared to atmospheric pressure, the same can be negated in the computations.

Assuming that the operating pressure $Po$ of the indicator 19 is known and the specific gravity of the liquid contained within the sensing tube 12 is also known, then the fornula $L = Po/(G \times S.G)$ is appliable. Using the values hereinabove set forth, $L = 5.8/(1 \times 0.827)$ or the length of the tube would need to be approximately 7 inches for the other known values. Thus it can be seen that the required length of the tube 12 can be determined by knowing the specific gravity of the liquid to be used therein and the operating pressure for full deflection of the indicator 19.

As has been hereinabove indicated, the sensing tube of the present invention should be mounted either parallel to the longitudinal axis of the vehicle or lateral thereto depending on whether acceleration forces or centrifugal forces are to be measured. Once the sensing tube 12 has been properly installed in a generally horizontal position, it is connected to pressure transmitting line 18 which in turn is operatively attached to the remote indicator 19. This indicator is preferably mounted on the instrument panel on the vehicle in clear view of the operator thereof. When the motion sensing liquid 20 is added to tube 12, its normal surface level 22 should extend a short distance up into the up-turned end portions 13 and 14 as shown in FIG. 2. Since the sensing tube 12 is generally horizontally disposed when the vehicle within which it is installed is resting on a level surface, the liquid surface levels in the tube end portion should be approximately equal.

As the vehicle moves forwardly or rearwardly, the acceleration lag will cause the fluid within tube 12 to effectively move in the opposite direction thus creating either a positive or a negative pressure within pressure line 18. The change in pressure within this line will be sensed by indicator 19 and read out on the dial face 23. If the fluid moves away from the end to which line 18 is connected and toward the vent end 13 as when the vehicle is accelerating rearwardly or is braking when traveling in a forward direction, a negative pressure will be developed which would indicate a negative reading on the dial face 23 of indicator 19. On the other hand, if the vehicle accelerates in a forwardly direction or brakes when traveling in a rearwardly direction, the fluid 20 contained within tube 12 would flow and move upwardly in end portion 14 thereby creating a positive pressure within line 18 giving a plus reading on dial 23. It is understood, of course, that tube 12 could be reversed in its position and the calibrations reversed on dial 23 to give positive G readings for forward acceleration and rearward braking and negative readings for rearward acceleration and forward braking.

Since the sensing tube 12 may not always be disposed exactly level, a small orifice should be provided such as that shown at 24 in line 18. This orifice should be of a very small size to bleed off, over an extended time, excess pressure in line 18, whether positive or negative. It has been found that an orifice of the size that will allow the indicator 19 to move from full deflection to zero in one hour is adequate to allow the device to be self-zeroing and yet not effect the operation of the device caused by motion of the vehicle. Also this bleeder orifice will automatically compensate for gas expansion due to changes in altitude and temperature. Additionally, changes in the altitude of the vehicle due to loading changes will be compensated for.

When the sensing tube 12 is mounted laterally to the longitudinal axis of the vehicle, preferably over the drive axle thereof, then in turns the fluid 20 will be acted upon by centrifugal force thus giving a reading to one side or the other of indicator 19. If desired, the dial face 23 can be changed to read left and right for lateral installation rather than the plus and minus used for longitudinal installation. This type of reading is highly desirable for vehicle drivers, particularly in races and other situations where turns are made at close to maximum speed. The reason for this is that with a little experimentation the driver can learn at what lateral G-force reading the wheels of the vehicle will begin to side slip thus causing the vehicle to go into what is commonly called a spin. Thus it can be seen that great advantage can be obtained from knowing when the vehicle is approaching the critical "spin-out speed" so that the same can be held as close to this speed as possible without exceeding it. Without this assistance, a driver cannot tell when he is about to slide until the vehicle actually begins its slide which is often too late to prevent a dangerous condition from developing or the thought of such a slide will cause the driver to be overly cautious which will cause loss of maximum possible speed under the conditions present.

When the force indicator of the present invention is mounted with the sensing tube fore and aft to act as an accelerometer, the device will also act as a clinometer when a constant speed is established either up or down an incline since the liquid 20 within the sensing tube 12 will under such conditions seek a level position which will create either a positive or negative pressure within line 18 connected to indicator 19. If desired, a second scale can be provided on dial 23 so that the same may be read in either G-forces or percentage of grade. Likewise, if the vehicle travels in a straight path on a lateral incline, the force indicator mounted to indicate centrifugal force will under such circumstances indicate the incline being traversed thus again acting as a clinometer.

Although an orifice has been indicated as allowing the system of the present invention to be self-zeroing, a needle valve for similar mechanisms could be installed to either supplement or replace the orifice so that the zeroing of the system could be more quickly and adequately controlled.

From the above, it is obvious that the present invention has the advantage of providing a force indicating means that can be used as either an accelerometer or a centrifugal force indicator. The present invention also has the advantage of being inexpensive to produce and install and yet uncomplex to repair and maintain. The present invention has the further advantage of being compact so that it can be installed and used on small vehicles and large vehicles alike. An even further advantage of the present invention is that it requires no outside motivating power for operation thus making it adaptable to any kind of vehicle or craft where it is desirable to measure forces relative thereto.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended Claims are intended to be embraced therein.

What is claimed is:

1. A force measuring system for a ground traversing vehicle adaptable to measure either acceleration, deacceleration and inclination, or centrifugal force, said force measuring system comprising, in combination: a vehicle; motion sensing means mounted in said vehicle for sensing lateral or fore-and-aft forces within the vehicle and creating pneumatic pressure in response thereto, said motion sensing means including a generally horizontally disposed, U-shaped fluid filled tube having upturned end portions; a pneumatic pressure indicating means mounted within said vehicle; means interconnecting one end portion of said generally U-shaped tube with said pneumatic pressure indicating means, wherein the transverse orientation of said tube relative to the longitudinal axis of said vehicle results in the pressure indicating means indicating centrifugal force acting on said vehicle, and wherein orientation of said tube generally parallel to the longitudinal axis of said vehicle results in said pneumatic indicating means indicating acceleration, deacceleration and inclination, and; an orifice means in said interconnecting means for bleeding the pressure therein to atmospheric pressure over an extended period of time when the force measuring system is in a static condition.

2. The force measuring means of claim 1 wherein one of said up-turned ends is open to the atmosphere and the other end is operatively connected to said connecting means.

3. The force measuring means of claim 1 wherein the means for operatively connecting the sensing means to the indicating means is a tube like line.

4. A force measuring system, as recited in claim 1, wherein the portion of said generally horizontal, U-shaped tube extending between the two upturned ends is substantially longer than either of said two upturned ends thereby being of relatively shallow depth and particularly suitable for mounting in either traverse or longitudinal orientations relative to the longitudinal axis of said vehicle.

5. The force measuring system, as recited in claim 4, wherein in the longitudinal orientation, said generally horizontally disposed tube is disposed adjacent a central console formed within the vehicle.

6. A force measuring system, as recited in claim 4, wherein in the traverse orientation said generally horizontal tube is aligned with and disposed adjacent the rear axis of said vehicle.

* * * * *